(12) United States Patent
Molhoek et al.

(10) Patent No.: US 7,893,169 B2
(45) Date of Patent: Feb. 22, 2011

(54) THERMOSETTING POWDER PAINT COMPOSITION COMPRISING A CROSSLINKER AND THERMOSETTING AMORPHOUS POLYAMIDE

(75) Inventors: Leendert Jan Molhoek, Nunspeet (NL); Renier Henricus Maria Kierkels, Beegden (NL); Pieter Gijsman, Beek (NL); Jasper Hendrik Johan Dutman, Apeldoorn (NL)

(73) Assignee: DSM IP Assets B.V., Heerlen (NL)

( * ) Notice: Subject to any disclaimer, the term of this patent is extended or adjusted under 35 U.S.C. 154(b) by 312 days.

(21) Appl. No.: 11/994,774

(22) PCT Filed: Jun. 29, 2006

(86) PCT No.: PCT/EP2006/006315
§ 371 (c)(1),
(2), (4) Date: May 1, 2008

(87) PCT Pub. No.: WO2007/006425
PCT Pub. Date: Jan. 18, 2007

(65) Prior Publication Data
US 2008/0226827 A1    Sep. 18, 2008

(30) Foreign Application Priority Data
Jul. 11, 2005    (EP)    .................. 05076579

(51) Int. Cl.
C08G 63/44    (2006.01)
C08G 69/44    (2006.01)
B05D 1/12    (2006.01)
B05B 15/08    (2006.01)

(52) U.S. Cl. .................... 525/451; 427/195; 428/477.7; 428/36.9

(58) Field of Classification Search ................. 525/451; 427/195, 239; 428/477.7, 36.9
See application file for complete search history.

(56) References Cited

U.S. PATENT DOCUMENTS

| | | | |
|---|---|---|---|
| 3,673,277 A * | 6/1972 | Schmitt et al. ............. | 525/183 |
| 3,880,947 A | 4/1975 | Labana et al. | |
| 4,147,737 A | 4/1979 | Sein et al. ................... | 260/835 |
| 4,855,358 A * | 8/1989 | Hart ........................... | 525/113 |
| 5,409,999 A | 4/1995 | Merval et al. | |
| 5,847,057 A | 12/1998 | Kaplan et al. | |
| 6,284,845 B1 | 9/2001 | Panandiker et al. ......... | 525/438 |

FOREIGN PATENT DOCUMENTS

| | | |
|---|---|---|
| EP | 0 322 834 | 7/1989 |
| WO | WO 94/03545 | 2/1994 |
| WO | 2007/006425 | 1/2007 |
| WO | WO 2007/006425 A2 | 1/2007 |

OTHER PUBLICATIONS

Hagiwara I., et al., "Solvent Resistance Clear Polyamide Contain Thermosetting Prefer Polyepoxide ESIN Useful Film Mould", 1 page, (Feb. 17, 1989).
International Search Report mailed Mar. 27, 2007.
Derwent Abstracts, 1989-097176 XP002424099, JP 01 045460 A, (Feb. 17, 1989).
International Search Report mailed Mar. 27, 2007 (PCT/EP2006/006315).
U.S. Appl. No. 11/994,774, filed Jan. 4, 2008.
Brüggemann Chemical, Polymer Additives, pp. 1-2, Germany, Oct. 2007.
U.S. Appl. No. 12/015,763, filed Jan. 17, 2008.
T. A. Misev, "Powder Coatings Chemistry & Technology", J. Wiley & Sons, 1991, p. 44-45.
Z. W. Wicks et al, "Organic Coatings Science & Technology", J Wiley & Sons, 1991, $2^{nd}$ edition, pp. 494-495, 498 & 505.

* cited by examiner

Primary Examiner—Frederick J Parker
(74) Attorney, Agent, or Firm—Nixon & Vanderhye P.C.

(57) ABSTRACT

The invention is directed to a thermosetting powder paint composition comprising a thermosetting amorphous polyamide. The amorphous polyamide has a glass transition temperature between 20° C. and 200° C. The polyamide may be a carboxyl-, a hydroxyl- or an amine functional polyamide. A carboxyl functional polyamide has an acid number between 10 and 150 mg of KOH/gram of resin. The invention also relates to a thermosetting powder paint composition comprising a thermosetting amorphous polyamide and an additive comprising a copper halogenide and another halogenide. The invention further relates to a process for coating a substrate at low temperature cure (LTC) conditions and a composition suitable for LTC.

23 Claims, No Drawings

THERMOSETTING POWDER PAINT COMPOSITION COMPRISING A CROSSLINKER AND THERMOSETTING AMORPHOUS POLYAMIDE

This application is the U.S. national phase of International Application No. PCT/EP2006/006315, filed 29 Jun. 2006, which designated the U.S. and claims priority to EP 05076579.1, filed 11 Jul. 2005, the entire contents of each of which are hereby incorporated by reference.

The invention relates to a thermosetting powder paint binder composition comprising a polymer and a crosslinker. The invention also relates to a powder paint composition comprising the binder composition and its use.

Thermosetting powder paint binder compositions comprising a polymer and a crosslinker are generally disclosed by Misev in Powder Coatings, Chemistry and Technology (1991, John Wiley) on pp. 42-54, pp. 148 and 224-226. A preferred polymer is polyester. A characteristic with polyester powder coatings is the very good color and gloss retention in outdoor exposure. Furthermore polyester powders have very good edge covering power, flow properties, wear resistance, in addition to a great tolerance regarding change of color if over-curing has happened. Also the chemical resistance in acid environments is good, less good in alkaline environments. However, the resistance against solvents is limited. As elucidated in Surface Coatings Technology (David Howell, Wiley, 2000, SITA Technology Limited), when epoxy resin is incorporated into a coating, the ether linkages confer excellent chemical resistance however the high aromatic content is responsible for impaired resistance to exterior durability.

It is the object of the present invention to provide a thermosetting powder paint composition having improved chemical resistance for solvents and maintaining the required quality level of the other properties.

The thermosetting powder paint binder composition according to the present invention is characterised in that the polymer is a thermosetting amorphous polyamide. An additional advantage above the already mentioned increased chemical resistance while maintaining a good level of the other properties is that the hydrolysis resistance is better compared to for example polyester-based powder coatings.

Another object of the invention is to provide a thermosetting powder paint binder composition that can be used at much lower curing temperatures than commonly used in powder coatings, while still obtaining excellent results for the cured coating. This object is reached by a binder composition comprising an acid-functional amorphous polyamide and an epoxy-based crosslinker. This specific combination of polyamide and crosslinker will hereinafter be referred to as "low temperature cure" (LTC) powder paint binder composition.

The amorphous polyamide according to the invention may contain functional end groups such as for example carboxyl groups, epoxy groups, anhydride groups, hydroxyl groups, amino groups, acetoacetonate groups, phosphoric acid groups, phosphorous acid groups and/or thio groups. According to a preferred embodiment of the invention the polyamide is a carboxyl-, a hydroxyl-, an amine-functional polyamide or it has a combination of any of these preferred functional groups. More preferably, the polyamide contains carboxyl-functional groups. Preferably, this carboxyl functional polymer has an acid number below 150 mg of KOH/gram of resin (polymer) and more preferably the acid number is lower than 70 mg of KOH/gram of resin. The acid number is generally higher than 5 and preferably higher than 10 mg KOH/gram of resin.

For the low temperature cure (LTC) powder paint binder composition, the amorphous polyamide is acid-functional. In LTC-applications it was found to be advantageous to use an acid-functional amorphous polyamide with aliphatic end groups, as coatings derived from polyamides with aliphatic end groups tend to show better appearance and are less prone to surface defects, like craters and blisters.

According to a preferred embodiment of the invention in general, the glass transition temperature ($T_g$) is between 20° C. and 200° C. A temperature less than 20° C. gives unacceptable physical stability of the system and a temperature higher than 200° C. results in a composition which cannot be processed. More preferably the glass transition temperature ($T_g$) is between 40° C. and 100° C. because this range results in an optimum combination of physical stability and processability of the composition.

The molecular weight (Mn) of the polyamide is not particularly critical and can be chosen between for example between 1000 and 10,000 g/mol, and preferably between 2000 and 6000 g/mol. The molecular weight is measured by GPC against a polystyrene standard.

The thermosetting powder paint binder composition according to the invention results in a coating having the desired properties with respect to for example chemical resistance for solvents as for example xylene and acetone, abrasion resistance, thermal stability and impact resistance. Furthermore the composition according to the invention results in an excellent hydrolytic stability.

The amorphous polyamide for use in the binder according to the invention, may comprise the polycondensation reaction product (or residue) of at least one diamine component and at least one dicarboxylic acid component. It will be clear to the man skilled in the art that in stead of or in combination with the dicarboxylic acid also its anhydride can be used. Hereafter with dicarboxylic acid is also meant its anhydride.

The amorphous polyamide according to the invention can be based on one type of amine and one type of carboxylic acid or the polyamide can be based on for example one type of amine combined with more than one type of carboxylic acid or it can be based on one type of carboxylic acid with more than one type of amine or it can be based on the combination of more than one type of amine with more than one type of carboxylic acid. It is however preferred to use a polyamide based on 2 to 4 diamines and 1 to 3 dicarboxylic acids.

Suitable dicarboxylic acids include for example dicarboxylic acids having from 3 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, and/or cycloaliphatic dicarboxylic acids preferably having 8 to 12 carbon atoms. The dicarboxylic acids may be branched, non-linear or linear. Preferably, the dicarboxylic acids are branched or non-linear. Examples of suitable dicarboxylic acids are for example phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid.

The nature of the diamine is not particularly critical as long as the finally obtained polyamide is amorphous. The diamine can for example be of an aliphatic, cycloaliphatic, aliphatic-aromatic or aromatic nature. The diamine component may comprise an aliphatic diamine having for example 2 to 12 carbon atoms. The aliphatic diamines may also contain aromatic groups in the molecule. With aromatic amines the glass transition temperature of the polyamide can be very high. It is therefore preferred to use aliphatic and aromatic-aliphatic amines. With aliphatic amine is meant a compound in which the amine-group is directly coupled to an aliphatic chain. With aromatic amine is meant a compound in which the amine group is directly coupled to an aromatic ring structure. The aliphatic diamines also include cycloaliphatic diamines such as for example piperazine. Examples of suitable aliphatic diamines include for example isophorondiamine, 1,2-ethylenediamine, 1,3-propylenediamine, 1,6-hexamethylenediamine, 1,12-dodecylenediamine, 1,4 cyclohexanebismethylamine, piperazine, p-xylylenediamine and/or m-xylylenediamine. The amine component may also comprise branching components to obtain branched polyamides. Suitable examples include for example di-alkylene-triamines such as for example di-ethylene-triamine, di-alkylene-tetramines, di-alkylene-pentamines, di-hexamethylene-triamine, poly-functional acids such as for example 1,3,5-benzene tricarboxylic acid, trimellitic anhydride and pyromelitic anhydride and poly-functional amino acids such as for example aspartic acid and glutamic acid.

With "amorphous" is here and hereinafter meant that the amorphous polyamide applied in the present invention does not show a sharply defined melting on crystallization peak on a second DSC scan at a rate of 5° C./min. Generally, an amorphous polymer and/or polymer composition is characterized by a high degree of transparency (clarity) and a lack of a sharply defined melting point. With amorphous is meant here that the amount of crystallinity calculated from the DSC-measurement is less than 10%, preferably less than 5% and more preferably less than 1%.

The polyamide may have for example a linear or nearly linear, branched, star or dendritic structure.

The present invention is not directed to the use of a polyesteramide as the thermosetting amorphous polyamide. With polyesteramide is meant here and hereinafter a polymer that contains both ester-bonds as well as amide-bonds, where the polyamide according to the invention does not contain ester-bonds.

Various types of crosslinkers may be employed in combination with the thermosetting amorphous polyamide. Examples of suitable polyamide/crosslinker combinations include saturated carboxyl functional polyamide resin/triglycidylisocyanurate (TGIC), saturated carboxyl functional polyamide resin/epoxy resin, saturated carboxyl functional polyamide resin/crosslinker containing hydroxylamide group, saturated carboxyl functional polyamide resin/aliphatic oxirane, saturated hydroxyl functional polyamide resin/isocyanate, saturated hydroxyl functional polyamide resin/diglycidyl phtalate containing crosslinker, saturated hydroxyl functional polyamide resin/hexamethoxy-methylmelamine (HMMM), saturated hydroxyl functional polyamide resin/glycoluril (derivative), saturated hydroxyl functional polyamide resin/benzoguanamine (derivative), saturated hydroxyl functional polyamide resin/amino resin, saturated hydroxyl functional polyamide resin/phenolic resin, amine functional polyamide resin/triglycidylisocyanurate (TGIC), amine functional polyamide resin/epoxy resin, amine functional polyamide resin/isocyanate and amine functional polyamide resin/diglycidyl phtalate containing crosslinker.

According to a preferred embodiment of the invention the polyamide/crosslinker composition is a composition comprising saturated carboxyl functional polyamide resin/triglycidylisocyanurate (TGIC), saturated carboxyl functional polyamide resin/epoxy resin, saturated carboxyl functional polyamide resin/crosslinker containing hydroxylamide group, amine functional polyamide resin/triglycidylisocyanurate (TGIC), amine functional polyamide resin/epoxy resin, amine functional polyamide resin/isocyanate and/or amine functional polyamide resin/diglycidyl phtalate containing crosslinker. It is preferred to use a non-bisphenol-A epoxy crosslinker when choosing an epoxy crosslinker, because of better outdoor durability.

The crosslinker for use in combination with the acid-functional amorphous polyamide in the LTC application is preferably chosen from the list comprising Araldite® PT910, Araldite® PT912, TGIC, more preferably Araldite® PT912 is chosen.

Generally, the weight ratio polyamide:crosslinker ranges between 50:50 and 98:2 and more preferably this ratio ranges between 75:25 and 95:5. The selection of the ratio is dependent on for example the selected crosslinker and the end application of the coating.

The preparation of thermosetting powder coatings in general and the chemical reactions for curing powder paints to form cured powder coatings are described by Misev in Powder Coatings, Chemistry and Technology (1991, John Wiley) on pp. 42-54, pp. 148 and 224-226. Test procedures are described at pages 284-300. A thermosetting powder paint binder composition is generally defined as the resinous part of the powder paint composition consisting of polymer and crosslinker and this composition generally contains more than 50 wt. % polymer and less than 50 wt. % crosslinker.

Next to the powder paint binder composition, the powder-paint composition according to the invention comprises generally at least one additive such as for example pigment, filler, degassing agent, flow agent and/or stabilizer. Suitable pigments are for example inorganic pigments, such as for example titanium dioxide, zinc sulphide, iron oxide and chromium oxide, and also organic pigments such as for example azo compounds. Suitable fillers are for example metal oxides, silicates, carbonates and sulphates. Primary and/or secondary antioxidants, UV stabilizers such as quinones, (sterically hindered) phenolic compounds, phosphonites, phosphites, thioethers, HALS compounds (hindered amine light stabilizers) and aromatic amines, may for example be used as stabilizers. Examples of degassing agents are benzoin and cyclohexane dimethanol bisbenzoate. The flow agents include for example polyalkylacrylates, fluorohydrocarbons and silicone fluids. Other suitable additives are for example additives for improving tribocharging, such as sterically hindered tertiary amines that are described in EP-B-371528.

Powder paints according to the invention can be applied to a suitable substrate in the usual manner, for example by electrostatically spraying the powder onto an earthed substrate and curing the powder paint to a powder coating by exposing the powder paint composition to heat at a suitable temperature for a sufficient length of time. The applied powder can for example be heated in a gas oven, an electric oven or with the aid of infrared radiation or UV-radiation.

The invention also relates to a thermosetting powder paint composition comprising a polyamide, a crosslinker and a stabilizer composition. It was found that sometimes discoloration occurred when a polyamide powder paint composition was cured. Therefore it was an object of the invention to provide a powder paint composition comprising a polyamide that did not discolor during curing. The discoloration occurred most often when curing took place in an oven.

The object of the present invention was reached by the addition to the polyamide comprising powder paint composition of an additive comprising a combination of a copper halogenide and at least one other halogenide.

The addition of the copper- and at least one other halogenide containing additive appeared advantageous for amorphous non-amine functional polyamides. The copper- and at least one other halogenide containing additive appeared especially advantageous for amorphous carboxyl-functional polyamides. The composition comprising the polyamide and at least one additive comprising copper- and at least one other halogenide, can be combined with all kinds of suitable crosslinkers. With suitable crosslinker is meant a crosslinker that is able to react with the functional groups present on the polyamide. Depending on the nature of the functional groups different crosslinkers can be chosen. Examples can be chosen from the list previous described.

The additive according to the invention comprises at least one copper-containing halogenide and at least one other halogenide. Examples of suitable other halogenides are potassium and sodium halogenide, preferably potassium halogenide is used. The ratio between the copper-halogenide and the potassium halogenide can be chosen between wide ranges. The only requirement is that the halogenide is present in an excess relative to the copper. The excess halogenide, thus the amount over the number of moles of copper, originates from the potassium halogenide. With excess is preferably meant at least 200% excess, preferably at least 600%, more preferably at least 900%. With an excess of 100% is meant that when 1 mole of copper-halogenide is present, 1 mole of other halogenide is present, this can also be represented by the following formula:

$$EH=(TH-CH)/CH,$$

Wherein:

EH=Excess halogenide

TH=total halogenide

CH=copper halogenide

The halogenide can be chosen to be fluoride, chloride, bromide or iodide. Preferably bromide or iodide is used. It is within the scope of the invention to use different halogenides for the copper-halogenide and the other halogenide. It is also possible and within the scope to use different kinds of copper halogenide or different kinds of potassium halogenide. So it is for example possible to use copper-chloride together with copper-bromide.

The amount of additive according to the invention added to the polyamide is not particularly critical. The desired amount will generally depend on the curing and processing conditions. The man skilled in the art can easily determine the best amount to fulfil his needs. Generally an amount of between 0.05 w % (weight based on total paint) and 5 w % is used, preferably between 0.1 w % additive according to the invention and 3 w % is used, most preferably between 0.2 w % and 0.6 w %.

The additive according to the invention can be combined with other stabilizing additives, for example with primary and/or secondary antioxidants, UV stabilizers for example quinones, (sterically hindered) phenolic compounds, phosphonites, phosphites, thioethers, HALS compounds (hindered amine light stabilizers) and aromatic amines can for example be used as stabilizers.

The invention further relates to a process for coating a substrate with a thermosetting powder paint composition according to the invention comprising at least the following steps:

a. Optionally pre-treating and/or pre-heating the substrate,
b. Applying a thermosetting powder paint composition comprising an amorphous polyamide and a crosslinker to the substrate,
c. Heating the coated substrate from step b) to a temperature and for such a period that the coating is at least partially cured,
d. Optionally applying a second cure step.

The process according to the invention is preferably used without the use of step a) and/or d). The process according to the invention is advantageously used to coat substrates with an amorphous polyamide/crosslinker combination as described above.

The process according to the invention can be used in various temperature regimes. The man skilled in the art can easily determine which temperature regime is most suitable for his application. The process has proven especially advantageous for temperature regimes whereby the temperature in step c) is below 150° C., but preferably not below 110° C. The man skilled in the art also knows, or can easily determine, for how long the temperature should be maintained to obtain a satisfactory coating. It has proven advantageous to use as the period in step c) less than 25 minutes, when the temperature is below 150° C.

The process according to the invention can be used to coat all kinds of substrates however as the man skilled in the art will appreciate, with this process at relatively low temperatures and short periods, it becomes possible to coat heat sensitive substrates with powder coating compositions. Examples of heat sensitive substrates are plastic, paper, cardboard, cork, solid wood, veneer, chip wood, wood composite material, for example particle board, high, medium or low density fibre board, plywood and other substrates that contain a significant amount of wood. However, the invention is also suitable for traditional heat resistant substrates, for example metal, (galvanized) steel, cast iron, other alloys, glass, ceramic and bricks.

The invention also relates to a substrate fully or partially coated with a composition according to the invention or obtained by a process according to the invention.

Thermosetting coatings intended for industrial applications are described further in general in Powder Coatings, Chemistry and Technology, Misev, pages 141-173 (1991).

Compositions according to the present invention can be used in powder paints for use on, for example, metal, wooden and plastic substrates. The preferred substrate is metal. The compositions are very suitable to be used in the technical field of internal and external pipe coatings, coatings of accessories of refineries and chemical plants, internal tank coatings, industrial coatings and coatings for machines and tools. The coatings are also suitable for use in the automotive industry for coating parts and accessories, household applications and parts of buildings. With the low temperature cure (LTC) systems as described above, various special applications come available such as for example pre-assembled constructions, applications on heat-sensitive substrate. Specially preferred applications are in furniture, kitchen cabinet doors, electronics industry like for example printed circuit boards.

Thermoplastic powder paint compositions comprising a polyamide are disclosed for example at pages 28-34 of Powder Coatings, Chemistry and Technology, Misev, (1991). However, these thermoplastic powder paint compositions are completely different from the thermosetting powder paint composition according to the present invention because of, amongst others, the different crosslink mechanism, the different crystallinity and the different molecular weight. Thermoplastic compositions comprising polyamide generally result in coatings that have insufficient or at least decreased hardness.

The invention will be elucidated with reference to the following non-limiting examples.

Experiment 1.

The Preparation of an Amino Functional Polyamide Resin.

1447 grams of isophorone diamine, 357 grams of hexane diamine and 700 grams of water were charged in a 6 liter reaction flask equipped with a stirrer, nitrogen sparge, a temperature control unit and distillation glassware. The reaction mixture was stirred until all the ingredients were dissolved. Next 2021 grams of sebacic acid were added in 60 minutes keeping the exothermic reaction below 80° C. and after this addition the mixture was heated slowly to 220° C., while the water was distilled off. After reaching the reaction temperature of 220° C. samples for acid value and amine value measurements were taken every hour. After reaching the targeted amine value the mixture was vacuum distilled for 30 minutes, the vacuum was set off and the resin discharged.

The obtained resin was an amorphous, crystal clear polyamide having an amine value of 45 mg KOH/gram resin, a Tg of 81° C. and a molecular weight of 2337 g/mol.

Experiment 2.

The Preparation of a Carboxyl-Functional Polyamide Resin.

The carboxyl-functional polyamide was prepared according to the process of Experiment 1 by using the following ingredients: 1266 grams of isophorone diamine, 280 grams of 2-methyl-1,5-pentanediamine, 700 grams of water and 2305 grams of sebacic acid.

The obtained polyamide resin was a clear amorphous resin with an acid value of 50.8 mg KOH/gram resin, a Tg of 76.5° C. and a molecular weight of 2209 g/mol.

EXAMPLES I-II

The Preparation of Powder Paints

The polyamide resin according to Experiment 1 and according to Experiment 2 were used to produce powder paint composition I and powder paint composition II by using the following procedure:

As indicated in Table 1 the polyamide resin according to Experiment 1 or Experiment 2, the crosslinker TGIC (Araldite® PT 912 or Vestagon® BF 1430), the flow aid (Resiflow® CP77), titanium dioxide (KRONOS® 2160), the antioxidant (Santowhite®) and the degassing agent (benzoine) were mixed in an extruder at 110° C. The extrudate was cooled, ground and sieved. The sieve fraction smaller than 90 micrometers was used as powder paint.

The powders were sprayed electrostatically onto aluminum panels. These panels were cured in a furnace at 230° C. for 2 minutes.

Table 1 shows the used amounts in grams and the curing conditions and Table 2 shows the test results. The test results show that a thermosetting powder paint binder composition comprising a thermosetting amorphous polyamide results in coatings with the required level of properties such as for example gloss, appearance and mechanical properties. The chemical resistance is excellent.

Test Methods

The various tests were performed according to the following methods:

Reverse impact is determined via ASTM 2794/69

Appearance

The coatings are viewed at in the reflection of a light source and are compare visually.

Flow

The flow is visually evaluated on coated panels.

Gloss is determined via ASTM D 523/70

König hardness is determined via DIN 53157

Gitterschnitt is determined via DIN 53151

Taber abrasion is determined via ASTM D 40 60

Chemical Resistance Tests

A cotton piece is soaked in the specific chemical and placed onto the cured coating. The cotton piece is covered with a petri glass to prevent evaporation of the chemical. After 16 hours the petri glass together with the cotton piece is removed, and the remaining chemical is cleaned off. The coating is judged with a scale 1 to 5 within 5 minutes. The coatings are also judged after recovery.

Acetone/Ethanol Double Rubs

A piece of cloth is soaked in the required solvent. The cured coating is rubbed with the soaked cloth. A combination of a move forward and backward is defined as 1 rub. The rubbing is continued until the coating is totally removed from the substrate or 100 rubs is reached. The coating is judged from very bad (coating almost totally removed) to excellent (coating is unattached).

Ethanol Versus Acetone Double Rubs

Polyamide powder coatings always resist 100 acetone double rubs, even if the coating is not cured at all. This is caused by the insolubility of the polyamide resin is acetone. The Polyamide resin is soluble in ethanol. Therefore using ethanol instead of acetone for testing polyamide powder coatings is a very severe test for the cured coating that is comparable to the acetone double rub test for polyester powder coatings.

TABLE 1

|  | Paint I | Paint II |
|---|---|---|
| Composition |  |  |
| PA Resin 1 | 158 |  |
| PA Resin 2 |  | 176 |
| BF 1530 | 42 |  |
| PT 912 |  | 24 |
| Santowhite ® | 1 | 1 |
| Kronos ® 2160 | 100 | 100 |
| Resiflow ® CP77 | 3 | 3 |
| Benzoin | 1.5 | 1.5 |
| Extrusion conditions |  |  |
| Temperature, ° C. | 110 | 110 |
| Curing Conditions |  |  |
| Curing temperature, ° C. | 230 | 230 |
| Curing time, min. | 2 | 2 |
| Substrate | AL 46 | AL 46 |

TABLE 2

| Test Results | Paint I | Paint II |
|---|---|---|
| Reverse impact | Full impact, 50μ | Full impact, 60μ |
| Appearance | Good/white | Moderate/yellow |
| Flow (10 = good, 1 = bad) | 8 | 4 |

TABLE 2-continued

| Test Results | Paint I | Paint II |
|---|---|---|
| Gloss 20°/60°/haze | 75.7/88.6/67.3 | 70.5/87.2/95.8 |
| Konig Hardness (s) | 233 | 231 |
| Gitterschnitt | Gt 0 | Gt 0 |
| Taber abrasion, 100 cycli, S33, mg | 43 | 55.5 |
| Aceton double rubs (100) | Pass, unattached | pass |
| Chemical resistance | | |
| Xylene | excellent | excellent |
| Water | excellent | excellent |
| MEK | moderate | moderate |

Experiment 3

The Preparation of an Acid and Amino Functional Polyamide Resin 866.27 grams of isophorone diamine, 525 grams of 2-methyl-1,5-pentanediamine, 87.36 grams of bis-hexamethylenetriamine, 1 gram of sodium hypophosphite and 500 grams of demineralized water were charged in a 6 liter reaction flask equipped with a stirrer, a nitrogen sparge, a temperature control unit and distillation glassware. The reaction mixture was stirred until the components were dissolved. 2378.86 grams of sebacic acid was added slowly in 60 minutes keeping the exothermic reaction below 80° C. After this addition the mixture was slowly heated to 220° C. while distilling water. After reaching reaction temperature of 220° C. the mixture was allowed to react for 2 hours. Amine and acid values were measured each hour. After reaching the target amine and acid values the mixture was vacuum distilled for 1 hour. The vacuum was set off and the resin discharged.

The obtained resin was an amorphous, crystal clear, nearly colorless polyamide with an acid value of 52 mg KOH/g resin and a Tg of 57° C.

Experiment 4-8

The Preparation of Various Amorphous Polyamides

Other amorphous polyamides were prepared according to the same method. The starting compounds and their amounts are indicated in Table 3.

Comparative Experiment 1

The Preparation of an Aliphatic Polyester Resin 484.59 grams of hydrogenated bisphenol A, 8.03 grams of glycerin, 99.42 grams of succinic anhydride, 0.75 grams of Fascat® 4101 (catalyst) and 0.75 grams of distearyl penta diphosphite (antioxidant) were charged in a 1 liter reaction flask equipped with a stirrer, a nitrogen sparge, a temperature control unit and distillation glassware. The reaction mixture was heated to 150° C. to melt and homogenize the mixture. At 150° C. the succinic anhydride was added and the mixture was slowly heated to 200° C. while distilling water. The mixture was allowed to react for 1 hour at 200° C., thereafter it was cooled to 150° C. At 150° C. 217.36 grams of adipic acid was added and the mixture was slowly heated to 230° C. while distilling water. The mixture was allowed to react for 1 hour at 230° C. Samples were taken each 30 minutes for acid value measurements. After reaching a steady acid value the mixture was cooled to 215° C. and vacuum distilled until target acid value was reached. The resin was cooled to 190° C. and discharged.

The obtained resin was an amorphous, crystal clear, colorless polyester with an acid value of 50 mg KOH/g resin, and a Tg of 43° C.

Comparative Experiment 2

The Preparation of an Aromatic Polyester Resin

Another polyester was prepared according to the same method as Comparative Experiment 1. The starting compounds and their amounts are indicated in Table 3.

EXAMPLES III-VIII AND COMPARATIVE EXAMPLE I-II

The Preparation of Powder Paints.

The polyamide resins according to Experiment 3-8 were used to produce powder paint compositions, Example III-VIII. The polyester resins for comparison (Comparative experiment 1 and 2) were used to produce powder paint compositions Comparative Example I and II.

The ingredients for the powder paint are weighted and premixed. The premix is extruded at a Prism TSE 16 PC extruder, at 200 rpm, and min 80% torgue at desired temperature. The extruded material is grinded in a Retsch ZM-100; 0.5 mm; at 18.000 rpm. The grinded material is sieved whereby the fraction with sizes<90μ is extracted and used as the powder. The composition of the powder paint and the preparation conditions are indicated in Table 4.

Table 5 shows test results for coating compositions cured under standard powder coating conditions. The test results show that a thermosetting powder paint binder composition comprising a thermosetting amorphous polyamide results in coatings with the required properties. Comparison with the standard polyester based powder coatings, shows for example clearly improved properties regarding chemical resistance and reverse impact.

Table 6 shows test results for coating compositions cured under low temperature cure (LTC) coating conditions, either on a gradient panel and also under a fixed temperature: 120° C. The test results show that a thermosetting powder paint binder composition comprising a thermosetting amorphous polyamide results in coatings with the required properties. Comparison with the standard polyester based powder coatings, shows for example clearly improved properties regarding chemical resistance and reverse impact. These improved properties are thus also obtained under low temperature cure conditions, which is very surprising especially when taking into account that it also holds for aliphatic amides. It is generally known in the art that polyester powder coating compositions that contain aromatic end groups, when combined with an epoxy-crosslinker, react much faster than polyesters with aliphatic end groups. Therefore it is very surprising that polyamides with aliphatic end groups react very quickly, even at low curing temperatures, while retaining their positive properties such as chemical resistance and reverse impact.

Table 7 shows test results for coating compositions cured under relatively high temperature (240° C.). It follows from the results as presented, that the addition to a coating composition of certain anti-oxidants, namely anti-oxidants that have a combination of copper-halogenide and at least one other halogenide, results in improved properties with respect to appearance, color and reverse impact.

TABLE 3

| Resin composition | Exp. 4 | Exp. 3 | Exp. 5 | Exp. 6 | Exp. 7 | Exp. 8 | Comp. Exp. 2 | Comp. Exp. 1 |
|---|---|---|---|---|---|---|---|---|
| Isophorone diamine | 135.8 | 866.27 | | 168.53 | | 866.27 | | |
| Dytek A (2-methyl-1,5-pentanediamine) | | 525 | 240.45 | 100.2 | 140 | 525 | | |
| 1,6-Hexanediamine | | | | | 169.62 | | | |
| Dytek BHMT-HP (bis-hexamethylenetriamine) | | | 87.36 | 38.27 | 15.02 | 87.36 | | |
| Hydrogenated bisphenol A | | | | | | | | 484.59 |
| Neopentyl glycol | | | | | | | 1795 | |
| Trimethylolpropane | | | | | | | 61 | |
| Glycerine | | | | | | | | 8.03 |
| Sebacic acid | 138.9 | 2378.86 | | 362.94 | 105 | 2378.86 | | |
| Adipic acid | | | 210 | | 210 | | 86 | 217.36 |
| Isophtalic acid | | | 193.57 | | 169.2 | | 2755 | |
| 1,4-Cyclohexane dicarboxylic acid | | | | | | | 450 | |
| Succinic anhydride | | | | | | | | 99.42 |
| Demi water | 70 | 500 | 100 | 120 | 120 | 500 | | |
| Sodium hypophosphite | 0.1 | 1 | 0.25 | 0.25 | 0.25 | 1 | | |
| Fascat 4101 | | | | | | | 2.25 | 0.75 |
| Distearyl penta difosfite | | | | | | | 4.5 | 0.75 |
| Appearance | clear, colorless | clear, colorless | clear, colorless | clear, yellow | clear, colorless | clear, colorless | clear, colorless | clear, colorless |
| Acid value (mg KOH/g resin) | 0.7 | 52 | 60 | 0 | 51 | 52 | 49-54 | 50 |
| Amine value (mg KOH/g resin) | 42 | 0 | 0 | 44 | 0 | 0 | — | — |
| Viscosity (Pa · s) | 17 @ 200° C. | 51 | 99 @ 160° C. | 45 @ 160° C. | | 51 | 7-12 | 60.2 |
| Aromatic/aliphatic | Aliphatic | Aliphatic | Aromatic | Aliphatic | Aromatic | Aliphatic | Aromatic | Aliphatic |
| Functionality | 2 | 2.3 | 3 | 2.3 | 2 | 2.3 | 2.25 | 2.3 |
| Theoretical Mn | 2244 | 2581 | 3367 | 2581 | 2244 | 2581 | | 2581 |
| Tg (° C.) | 96 | 57 | 60 | 66 | 58 | 57 | 51 | 43 |

TABLE 4

| Paint compositions | Ex. 4 | Ex. 3 | Ex. 5 | Ex. 6 | Ex. 7 | Ex. 8 | Comp. Ex. 2 | Comp. Ex. 1 |
|---|---|---|---|---|---|---|---|---|
| Resin | 164 | 176 | 172 | 246 | 176 | 176 | 176 | 176 |
| Araldite PT912 | | 24 | 28 | | 24 | 24 | 24 | 24 |
| Vestagon BF1530 | 36 | | | 54 | | | | |
| CETAB | | 3.52 | 3.44 | | 3.52 | 3.52 | 3.52 | 3.52 |
| Kronos 2160 | 100 | 100 | 100 | 150 | 100 | 100 | 100 | 100 |
| Resiflow CP 77 | 3 | 3 | 3 | 4.5 | 3 | 3 | 3 | 3 |
| Benzoin | 1.5 | 1.5 | 1.5 | 2.25 | 1.5 | 1.5 | 1.5 | 1.5 |
| Naugard A | 0.42 | | | | | | | |
| Irganox 1010 | 0.42 | | | | | | | |
| Chimassorb 119 FL | 0.42 | | | | | | | |
| Bruggolen H3373 | | | 0.92 | | 0.92 | | | |
| Bruggolen H3336 | | | | | | 0.92 | 0.92 | 0.92 |
| Extruder | Prism TSE 16 PC, 200 rpm, min 80%, | | | | | | | |
| Extrusion temp ° C. | 130 | 90 | 100 | 130 | 90 | 90 | 90 | 90 |
| Grinding | Retsch ZM-100; 0.5 mm; 18.000 rpm | | | | | | | |
| Powder Tg (Tg/onset Tg) ° C. | 58/41 | 35/25 | 57/53 | 55/51 | 32/26 | 44/36 | 41/35 | 30/24 |

Araldite PT912 is a crosslinker obtainable from Huntsman Advanced Materials (Europe)
Vestagon BF 1530 is a crosslinker obtainable from Degussa Huls
Kronos 2160 is a pigment obtainable from Kronos Europe
Resiflow CP 77 is a flow additive obtainable from Worlee Chemie GmbH
Naugard A is an anti-oxidant obtainable from Crompton Corporation, UK
Irganox 1010 is an anti-oxidant obtainable from Ciba Specialty Chemicals, Belgium
Chimassorb 119 FL is an anti-oxidant obtainable from Ciba Spezialitatenchemie AG, Switserland
Bruggolen H3373 and Bruggolen H3336 are copper-halogenide based anti-oxidants obtainable from Brüggemann Chemical, Heilbronn, Germany

TABLE 5

| | Exp. 4 | Exp. 5 | Exp. 6 | Exp. 7 | Exp. 8 | Comp. Exp. 2 | Comp. Exp. 1 |
|---|---|---|---|---|---|---|---|
| Cure time (minutes) | 10 | 10 | 10 | 10 | 10 | 10 | 10 |
| Cure temperature (° C.) | 200 | 180 | 200 | 180 | 180 | 180 | 180 |
| Substrate | AL46 | AL46 | AL46 | AL46 | AL46 | AL46 | AL46 |
| Appearance | ok | ok, very bad flow | ok | ok | ok | ok | ok |
| Reverse impact (60 inch/pound @ 50μ) | pass | pass | pass | pass | pass | fail, too many cracks | fail |

TABLE 5-continued

| | Exp. 4 | Exp. 5 | Exp. 6 | Exp. 7 | Exp. 8 | Comp. Exp. 2 | Comp. Exp. 1 |
|---|---|---|---|---|---|---|---|
| Gloss (20°/60°/haze) | 72.3/91/156 | 1.3/5.0/15.4 | 75/90/101 | 50.8/91.3/440 | 62.2/88.6/217 | 86.6/94.4/51.4 | 78.3/88.8/47.4 |
| König hardness (seconds) (n = 2) | 224 | 104 | 198 | 189 | 204 | 160 | 189 |
| Adhesion (Gitterschnitt) | Gt 0 | Gt 0 | Gt 0 | Gt 0 | Gt 0 | Gt 0 | Gt 0 |
| Taber abrasion (mg) (n = 2) | 45 | 53 | 41 | 37 | 47.5 | 61.5 | 88 |
| Colour (L*/a*/b*) | 96.5/−1.5/0.5 | 94/−1.6/6 | 97/−1.5/0.8 | 95.2/−1.3/4.1 | 95.7/−1.3/1.9 | 93.5/−1.5/1.2 | 96/−1.2/2.3 |
| Ethanol resistance (EDR)/ aceton resistance (ADR) | 100 EDR, good | 100 EDR, excellent | 100 EDR, good | 100 EDR moderate/good | 100 EDR, good | 56 ADR | 100 ADR, good |
| Chemical resistance[1] initial/after recovery | | | | | | | |
| Xylene | 4/5 | 5/5 | 4/4 | 4/4 | 3/4 | 2/3 | 1/1 |
| Butyl acetate | 5/5 | 4/4 | 4/4 | 4/4 | 3/4 | 2/3 | 1/1 |
| MEK | 3/3 | 4/4 | 4/4 | 3/3 | 4/4 | 3/2 | 1/1 |
| 48% Ethanol | 5/5 | 5/5 | 4/4 | 2/2 | 4/4 | 5/5 | 5/5 |
| N-methylpyrolidon | 2/3 | 2/2 | 2/3 | <1/<1 | 2/2 | 1/1 | 1/1 |

[1]5 = good, 1 = bad

TABLE 6

| | | Exp. 7 | Exp. 8 | Comp. Exp. 2 | Comp. Exp. 1 |
|---|---|---|---|---|---|
| Cure time (minutes) | | 10 | 10 | 10 | 10 |
| Cure temperature (° C.) | | 100-200 | 100-200 | 100-200 | 100-200 |
| Substrate | | AlMg3 | AlMg3 | AlMg3 | AlMg3 |
| Reverse impact (gradient panels) | 170° C. | pass | pass | fail, to many cracks | fail, too many cracks |
| | 150° C. | pass | pass | fail | fail |
| | 130° C. | pass | pass | fail | fail |
| Ethanol resistance (EDR)/ aceton resistance (ADR) | 180° C. | 100 EDR, moderate/good | 100 EDR, good | 81 ADR | 100 ADR, good/moderate |
| | 160° C. | 100 EDR, moderate/good | 100 EDR, moderate/good | 76 ADR | 75 ADR |
| | 140° C. | 100 EDR, moderate | 100 EDR, moderate/good | 63 ADR | 55 ADR |
| | 120° C. | 50 EDR | 100 EDR, moderate | 27 ADR | 19 ADR |
| | 110° C. | 10 EDR | 10 EDR | 4 ADR | 10 ADR |
| Cure time (minutes) | | 30 | 30 | 30 | 30 |
| Cure temperature (° C.) | | 120 | 120 | 120 | 120 |
| Substrate | | AL46 | AL46 | AL46 | AL46 |
| Appearance | | ok | ok | ok | ok |
| Reverse impact (60 inch/pound @ 50μ) | | pass | pass | fail | fail |
| Gloss (20°/60°/haze) | | 34.3/83/534 | 57.9/88/282 | 88/95.9/45.2 | 82.4/90.3/16.3 |
| König hardness (seconds) | | 175 | 200 | 209 | 196 |
| Adhesion (Gitterschnitt) | | Gt 0 | Gt 0 | Gt 0 | Gt 0 |
| Colour (L*/a*/b*) | | 96/−1.5/2.1 | 91.3/−1.3/1.2 | 94.8/−1.5/1.1 | 96.7/−1.4/1.2 |
| Ethanol resistance (EDR)/ aceton resistance (ADR) | | 100 EDR, moderate/good | 100 EDR, good | 86 ADR | 95 ADR |

TABLE 7

| | Exp. 3 | Exp. 8 | Comp. Ex. 1 |
|---|---|---|---|
| Cure time (minutes) | 10 | 10 | 10 |
| Cure temperature (° C.) | 240 | 240 | 240 |
| Substrate | AL36 | AL36 | AL36 |
| Appearance | brown, reduced gloss | ok, light yellow | ok, light yellow |
| Reverse impact (60 inch/pound @ 50μ) | pass, 3 cracks | pass | pass, 1 crack |
| Gloss (20°/60°/haze) | 23.5/67.6/293 | 64.1/88.4/212 | 76.1/88.5/75.1 |
| König hardness (seconds) | 194 | 196 | 189 |
| Colour (L*/a*/b*) | 72.9/6.7/15 | 94/−0.5/5.3 | 94.3/−1.4/3.2 |
| Ethanol resistance (EDR)/ aceton resistance (ADR) | 100 EDR, good | 100 EDR, excellent | 100 ADR, moderate/good |

The invention claimed is:

1. A thermosetting powder paint binder composition comprising a thermosetting amorphous polyamide having functional groups and a crosslinker which is reactive with the functional groups of the thermosetting amorphous polyamide.

2. A composition according to claim 1, wherein the functional groups are end groups.

3. A composition according to claim 1, wherein the functional groups of the thermosetting amorphous polyamide are carboxyl, hydroxyl or amino groups.

4. A composition according to claim 3, wherein the functional groups are end groups.

5. A composition according to any one of claims 1-4, wherein the thermosetting amorphous polyamide has a glass transition temperature between 20° C. and 200° C.

6. A composition according to claim 1, wherein the thermosetting amorphous polyamide is acid functional.

7. A composition according to claim 6, wherein the acid functional thermosetting amorphous polyamide is carboxyl functional.

8. A composition according to claim 6, wherein the crosslinker is epoxy-based.

9. Composition according to claim 8, wherein the acid functional thermosetting amorphous polyamide has aliphatic end groups.

10. A thermosetting powder paint composition comprising a thermosetting powder paint binder composition according to claim 1 and at least one additive.

11. A composition according to claim 10, wherein the at least one additive comprises a combination of a copper halogenide and at least one other halogenide.

12. A composition according to claim 10, wherein the at least one additive comprises a combination of a copper halogenide and a potassium halogenide.

13. A coating prepared by curing the composition according to claim 10.

14. A process for coating a substrate with a thermosetting powder paint composition to form a coated substrate, the process comprising at least the following steps:

a) optionally pre-treating and/or pre-heating said substrate, b) applying the thermosetting powder paint composition comprising a thermosetting amorphous polyamide having functional groups and a crosslinker which is reactive with the functional groups of the thermosetting amorphous polyamide and at least one additive, to form the coated substrate, c) heating the coated substrate from step b) to a temperature and for such a period of time sufficient to at least partially cure the coated substrate, d) optionally curing for a second time the at least partially cured coated substrate from step c).

15. Process according to claim 14, wherein the temperature in step c) is below 150° C. and the period of time is less than 25 minutes.

16. Process according to claim 14, wherein the at least one additive comprises a combination of a copper halogenide and at least one other halogenide.

17. Process according to claim 16, wherein the at least one other halogenide is a potassium halogenide.

18. A coated substrate comprising a substrate and a thermosetting powder paint binder composition according to claim 1, wherein the composition is at least partially coated onto a surface of the substrate.

19. A coated substrate comprising a substrate and a coating according to claim 13.

20. A coated substrate obtained by a process according to claim 14.

21. A coated substrate according to any one of claims 18-20, wherein the substrate is selected from pipes, accessories of refineries and chemical plants, tanks, machines and tools.

22. A coated substrate according to any one of claims 18-20, wherein the substrate is an internal or external pipe surface.

23. A coated substrate according to any one of claims 18-20, wherein the substrate is an internal tank surface.

* * * * *